United States Patent [19]

Kopaska

[11] 3,797,215

[45] Mar. 19, 1974

[54] APPARATUS FOR FORMING ROLLS OF HAY

[76] Inventor: Arnold F. Kopaska, Rural Rt. 4, Guthrie Center, Iowa 50115

[22] Filed: Nov. 9, 1972

[21] Appl. No.: 305,054

[52] U.S. Cl. ............................................ 56/341
[51] Int. Cl. ............................................ A01d 75/00
[58] Field of Search ........................... 56/341, 16.4

[56] References Cited
UNITED STATES PATENTS

| | | | |
|---|---|---|---|
| 3,680,296 | 8/1972 | Beebout | 56/341 X |
| 3,110,145 | 11/1963 | Avery | 56/341 X |

Primary Examiner—Russell R. Kinsey
Assistant Examiner—J. N. Eskovitz
Attorney, Agent, or Firm—Henderson & Strom

[57] ABSTRACT

An apparatus for forming rolls of hay from a windrow of hay lying in a field. A wheeled frame includes sides spaced apart sufficient to pass on either side of the hay windrow. A lift means is mounted to the rear of the frame, being pivotally connected at its upper end and resting at its lower end on the frame, and with means for raising the lift means upwardly and rearwardly about its pivot. A subframe is pivotally secured at its rear end to the lower end of the lift means and is rockably suspended forwardly and between the sides. At least three rollers are mounted in a triangular relationship on the subframe and have a plurality of endless, flexible belts extended longitudinally of the apparatus and trained side-by-side over the rollers. The rear roller, rotated in response to operation of the apparatus, has teeth associated therewith which perform the dual function of beginning to form a roll of hay as the apparatus passes over the windrow while serving to maintain the belts in alignment; and with the subframe pivoting upwardly about the lower end of the lift means as the hay is rolled up as a snowball. When the roll reaches a predetermined size, the lift means is raised, carrying upwardly with it the subframe to clear the roll whereby the apparatus can be moved away from the roll.

13 Claims, 16 Drawing Figures

PATENTED MAR 19 1974 3,797,215

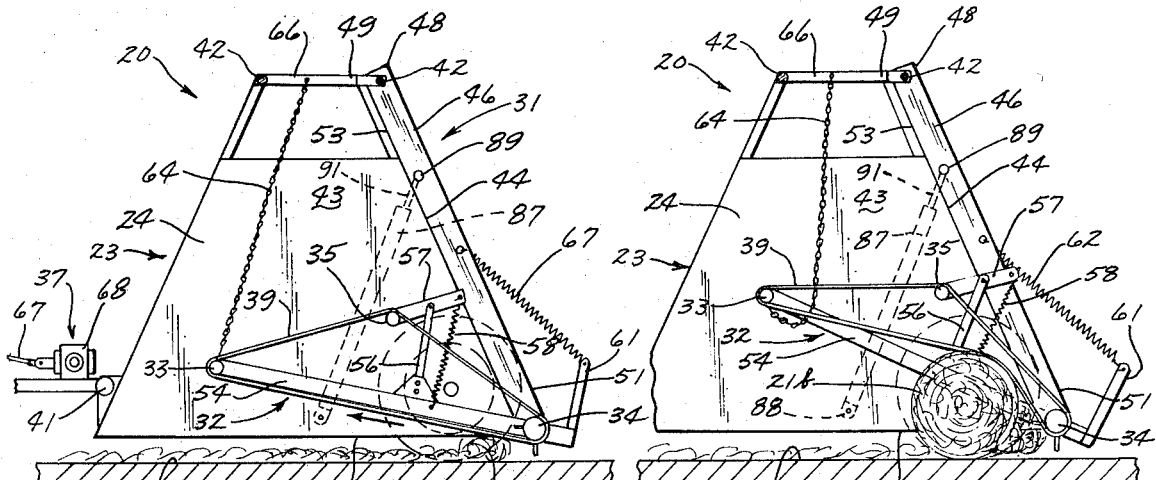
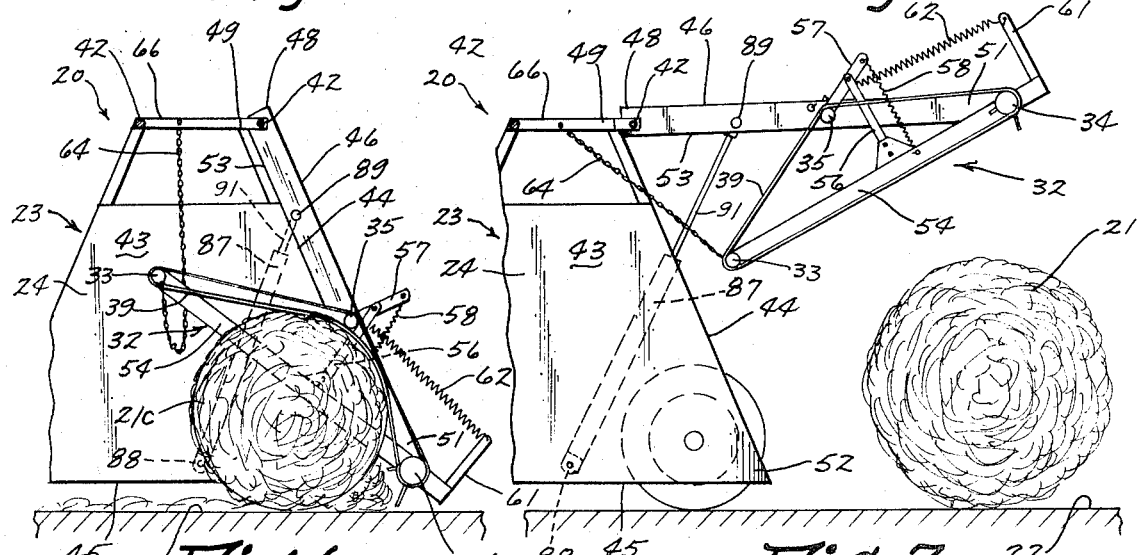
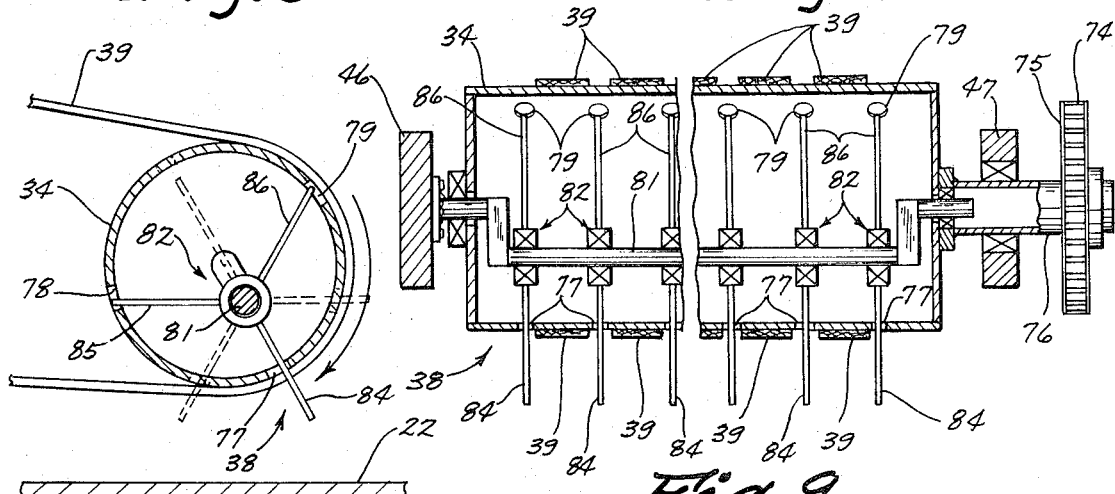

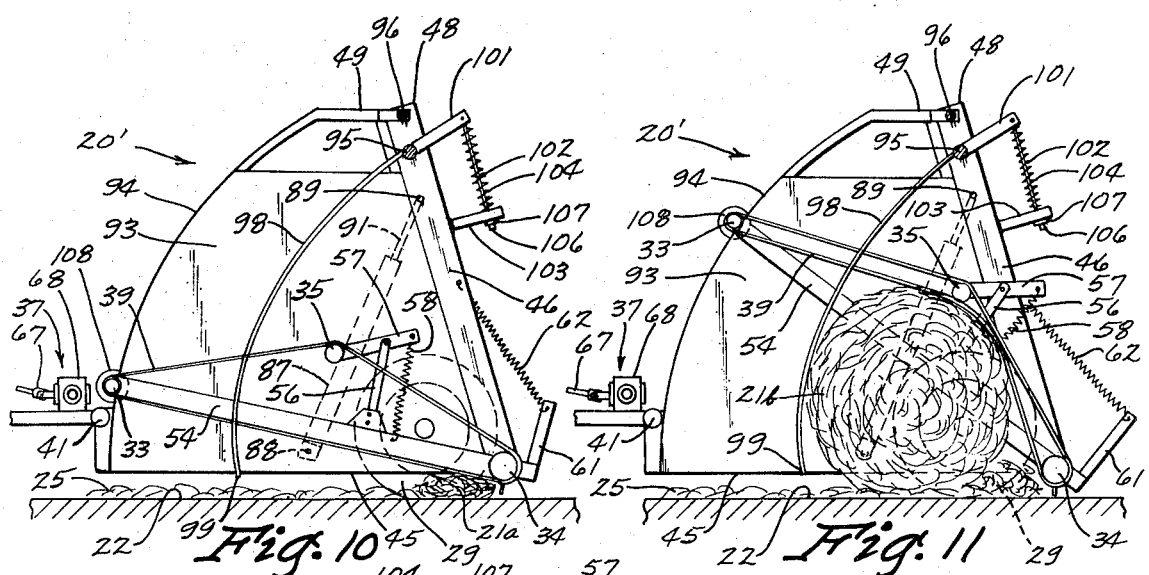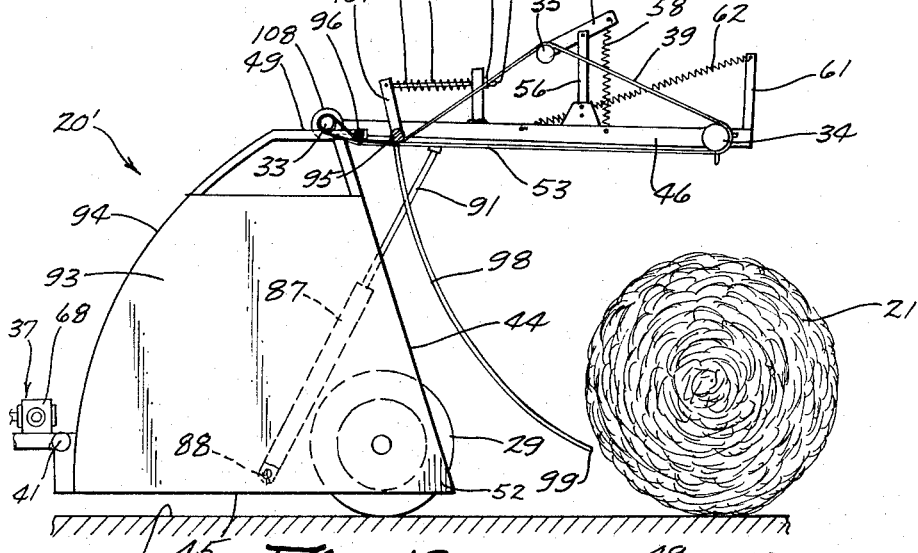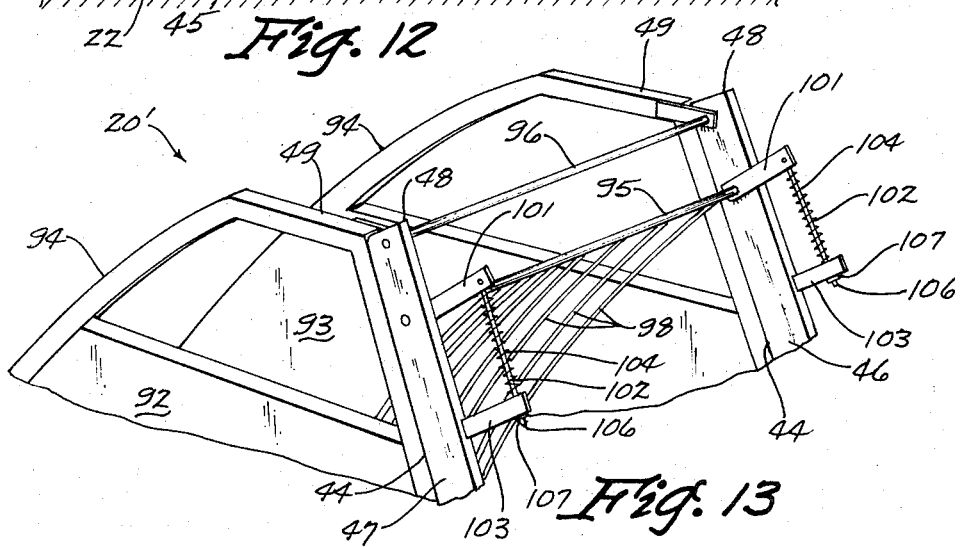

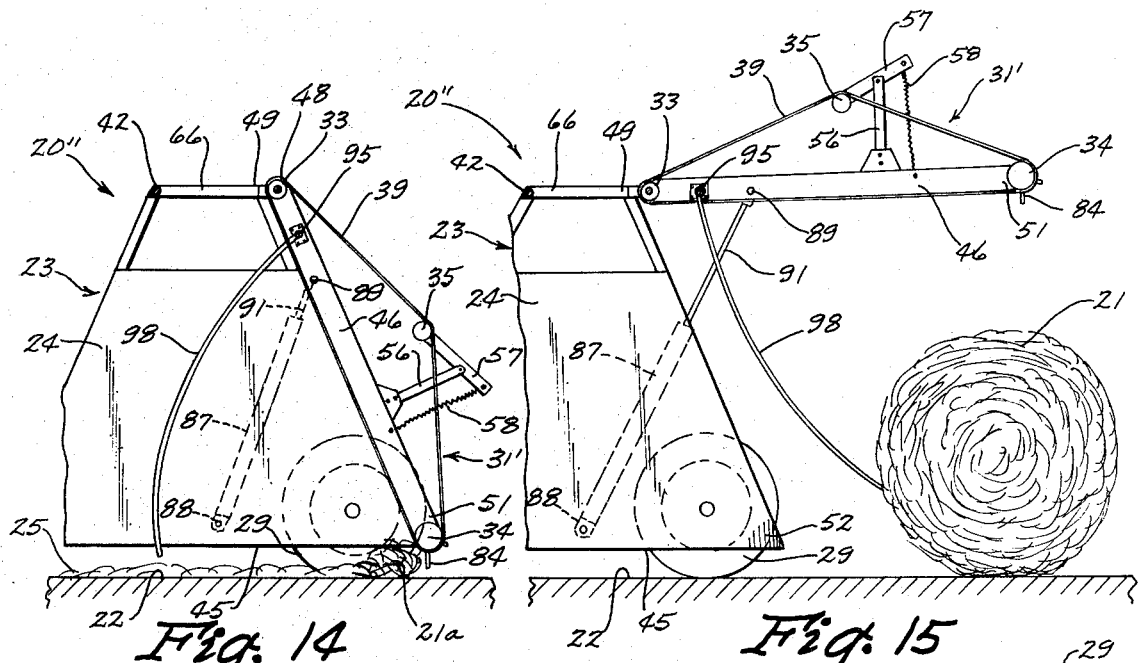
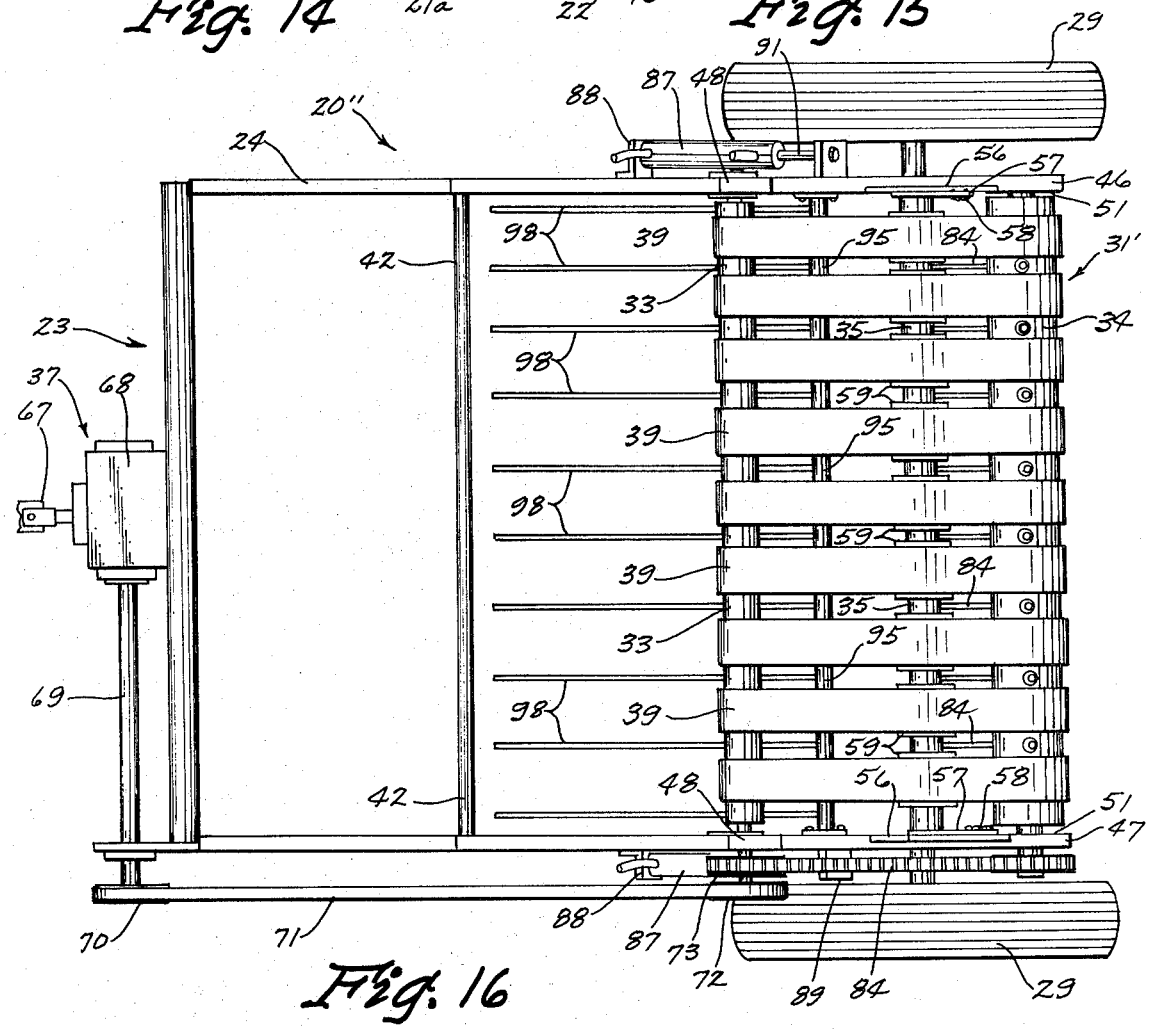

APPARATUS FOR FORMING ROLLS OF HAY

BACKGROUND OF THE INVENTION

This invention relates to an apparatus for forming rolls of hay from hay which has recently been cut and is lying in a swath or windrow in a field. More particularly, it relates to an apparatus which is pulled over and longitudinally of a swath or windrow of partially cured hay lying in a field and which forms from the windrow a generally cylindrical roll of hay of a predetermined size.

There are several conventional methods and apparatus for collecting and storing cut hay. One comprises the picking up of loose cut hay in a wheeled vehicle, which hay is then stacked in a conventional haystack or inside an enclosure. Another method utilizes a racking apparatus and a pickup hay baler wherein the hay is formed into generally rectangular bales of hay. Such bales must be covered if in the field, or must be stored in a protected place otherwise.

In more recent years, apparatus has been developed for forming rolls of hay as is contemplated by the present invention. One embodiment is shown in U.S. Pat. No. 3,650,100 wherein structure is provided for forming a large roll of hay in a snowball fashion. Applicant has found, however, that such structure and others like it are inordinately complicated and include massive pieces of machinery which are unnecessarily cumbersome.

SUMMARY OF THE INVENTION

The present invention provides for forming a cylindrical roll of hay by a relatively simple structure which comprises a main frame including a pair of interconnected, upright side panels which are spaced apart a distance sufficient to pass on either side of a hay windrow; a tongue unit connected to the main frame for connection in turn to a prime mover such that the main frame can be pulled lengthwise over the windrow; the main frame being provided with ground engaging wheels which carry the main frame; lift structure which has an upper end pivotally connected to the upper rear end of the frame and which has a lower end which can rest against the lower rear end of the main frame, the lift structure pivotally movable about the upper pivot from the position resting against the main frame to a raised position wherein it extends rearwardly away from the main frame; a subframe which is pivotally connected at a rear end to a lift structure lower end and which extends forwardly thereof, with three elongated rollers rotatably mounted on the subframe and extended transversely between the side panels, the rollers forming a triangular pattern and mounting a plurality of flexible belts which are trained about the rollers in laterally spaced realtion between the side frames; there being means connected between the subframe and the main frame for normally biasing the subframe about its pivoted rear end toward a spaced position above the ground; means being provided for rotating the rearmost roller during operation of the apparatus; a plurality of teeth being associated with the rearmost roller and extended outwardly from the periphery thereof so as to contact and start a roll of hay during movement of the apparatus, which teeth also serve to maintain the belts in longitudinally spaced relation during operation; and with means provided for lifting the lift structure about its upper pivot end whereby the subframe is raised above the roll of hay thereby freeing the apparatus from the roll.

A first modification of the invention involves the provision of a plurality of flexible fingers which form a rake in front of the subframe to aid in forming the roll, and which also effect an automatic ejection of the hay roll at the end of its formation.

A second modification in effect combines the lift structure and the subframe into one unit, thus eliminating certain elements and further simplifying the apparatus.

It is an object of this invention to provide a novel apparatus for forming a roll of hay.

It is another object of this invention to provide a hay roller wherein the unit which forms the roll is a subframe pivotally connected to the lower rear of the apparatus and using said connection as a fulcrum about which to rock the subframe while maintaining compactive and moving engagement with the roll to keep it forming.

Yet another object of this invention is to provide a hay roller wherein the unit for forming the roll is carried by a lift frame pivotally connected to the top rear of a main frame, which lift frame is readily and easily raised about its pivotal connection for clearing the roll forming unit from the roll.

Still another object of this invention is the provision of an apparatus for forming a roll of hay wherein means are provided for automatically ejecting the roll of hay from the roll forming apparatus at the end of the process of forming.

Yet another object of this invention is the provision of teeth associated with a roll over which roll engaging belts are trained, which teeth operate to initiate the forming of a roll of hay while maintaining the belts in laterally spaced relation to each other.

It is another object of this invention to provide an apparatus for forming a roll of hay from a swath of cut hay lying in a field, which apparatus is capable of attaining the above designated objectives while being simple in structure, effective in operation, and easily serviced.

These objects and other objects and features of this invention will be readily apparent upon reference to the following description and accompanying drawings.

BRIEF DESCRIPTION OF THE DRAWINGS

FIG. 4 is a reduced cross sectional view in elevation as taken along the line 4—4 in FIG. 3, and showing the relative position of various parts of the apparatus at the beginning of a hay roll forming operation, certain roller driving parts being eliminated and other parts shown in dotted lines for clarity of invention;

FIG. 5 is a view similar to FIG. 4 wherein a roll of hay is partially formed;

FIG. 6 is a view similar to FIGS. 4 and 5 wherein the roll of hay is substantially completed;

FIG. 7 shows the apparatus of FIGS. 4-6 in a position wherein a subframe unit has been raised to clear the apparatus from the completed roll of hay;

FIG. 8 is an enlarged vertical sectional view taken along the line 8—8 in FIG. 3;

FIG. 9 is a sectional view taken along the line 9—9 in FIG. 3;

FIGS. 10-13 are views similar to FIGS. 4-7 of a modified form of the invention; and FIGS. 14-16 are views similar to FIGS. 3, 4 and 6 of a second modification.

DESCRIPTION OF THE PREFERRED EMBODIMENT

Figure 1:
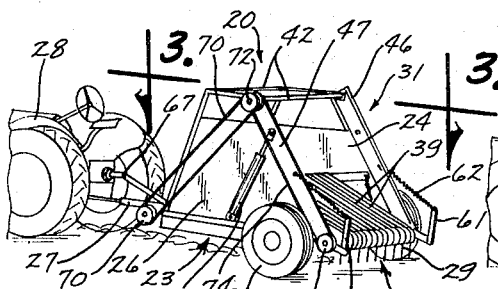
FIG. 1 is a perspective view from the left rear of one embodiment of a hay rolling apparatus of this invention, shown connected to a farm tractor as a prime mover.
Figure 2:
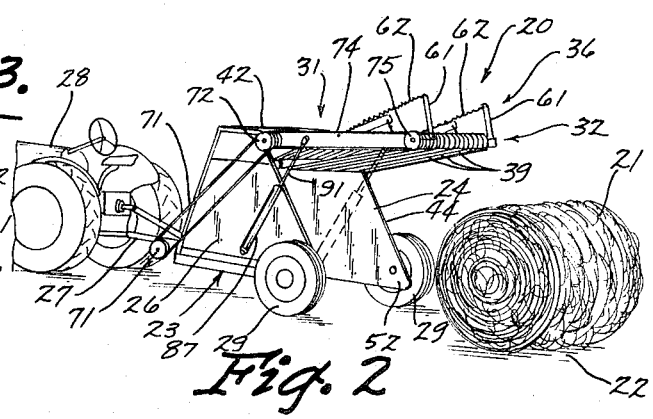
FIG. 2 is a perspective of the same apparatus, showing the apparatus of FIG. 1 at the end of its hay roll forming operation, with a roll of hay discharged rearwardly thereof.

Referring to the drawings, and particularly to FIGS. 1 and 2 a preferred embodiment of the hay roll forming apparatus - hereinafter referred to as the hay roller, is generally indicated at 20 and operates upon movement to form a cylindrical roll of hay 21 on top of the ground 22 (FIG. 4).

Generally the hay roller 20 comprises a main frame 23 having a pair of upright, laterally spaced side panels 24 and 26 which are spaced apart a distance sufficient to pass on either side of a hay windrow 25 (FIG. 1); a tongue unit 27 for connecting the main frame 23 to a prime mover such as a tractor 28 (FIGS. 1 and 2); with the main frame 23 mounted on a pair of ground engaging wheels 29 secured to either side of the side panels 24 and 26; a lift structure 31 pivotally connected to the rear of the main frame 23 for carrying a subframe 32 which includes a front roller 33 (FIG. 4) a rear roller 34, and an intermediate roller 35, which rollers form a triangular formation in side elevation; the apparatus 20 including further a bias unit 36 for maintaining the subframe 32 extended forwardly from the rear of the apparatus 20 and disposed above the ground 22; a drive unit 37 for rotating the rear roller 34 being provided; a tooth assembly indicated generally at 38 in FIGS. 8 and 9 also being provided for starting the roll of hay as the apparatus 20 is moved longitudinally thereover; and with the hay roller 20 being completed by a plurality of laterally spaced belts 39 (FIG. 3) trained about the trio of rollers 33, 34 and 35 for movably engaging the hay and rolling it in snowball fashion as the apparatus 20 is moved thereover.

More specifically, the main frame 23 includes a transverse front brace 41 (FIG. 3) which extends across the lower front so as to interconnect the side panels 24 and 26, with a pair of upper braces 42 (FIGS. 1 and 2) also being provided for stabilizing the side panels 24 and 26. Each side panel may include a solid side wall 43 (FIG. 4) the lower edge 45 of which may be spaced closely adjacent the ground 22 for enclosing the roll 21 of hay as it is formed. The rear of each side panel 24 and 26 comprises a sloping edge 44 for a purpose described in detail hereinafter.

The lift structure 31 includes a pair of elongated lift arms 46 and 47 (FIGS. 3 and 4) the upper ends 48 of which are pivoted to the upper rear ends 49 of the main frame 23. The lower ends 51 of the lift arms 46 and 47 rest upon the lower rear ends 52 of the main frame side panels 24 and 26 such that the leading straight edge 53 of the lift arms 46 and 47 may rest upon the rear sloping edge 44 of the side panels. The lower ends 51 of the lift arms 46 and 47 can be interconnected by the rear roller 34.

The subframe 32 includes a pair of parallel, elongated extension members 54 (FIGS. 3 and 4) the rear ends of which are rotatably mounted on the rear roller 34 such as to adapt the extension members 54 to a rocking movement about the rear roller 34. At the mid point of each extension member 54 a T-member 56 (FIG. 4) is secured with a rocker arm 57 pivotally mounted to the upper end thereof. At the lead end of the rocker arm 57 the intermediate roller 35 is rotatably mounted, with the rear end of the rocker arm 57 being connected by a spring 58 to the extension member 54. By this arrangement, the intermediate roller 35 is continually biased upwardly and away from the extension members 54. The front roller 33 interconnects the forward ends of the extension members 54. It will be noted in FIG. 3 that a plurality of laterally spaced belt guides 59 are mounted on the intermediate roller 35 for helping maintain the belts 39 in laterally spaced alignment.

The bias unit 36 for maintaining the subframe 32 in the positions of FIGS. 4 – 7 inclusive comprises an upright element 61 mounted to the rear of the extension members 54, and with a spring 62 connecting the upper end of each element 61 with a respective lift arm 46 or 47. This arrangement provides for a continual bias of the extension members 54 counterclockwise about the rear roller 34 as viewed in FIGS. 4 – 7, or downwardly and toward the ground 22. A chain 64 is connected between an upper side panel brace 66 and the front end of each extension member 54 (FIG. 3) for the purpose of limiting the downward movement of the subframe 32 toward the ground.

Drive for the rear roller 34 is provided from the tractor PTO 67 (FIG. 1) to a gear box 68 (FIG. 3) mounted to the front brace 41, with a drive shaft 69 being connected to a side pulley 70 also mounted at one end of the front brade 41, from whence a V-belt 71 rotates another pulley 72 mounted to the upper portion of the side panel 24, for example. A drive sprocket 73 (FIG. 3) is mounted in axial alignment with the pulley 72, and drives a chain 74 which in turn is entrained about a driven sprocket 75 mounted at the outer end by a shaft 76 (FIGS. 3 and 9) of the rear roller 34. By this arrangement, operation of the tractor 28 effects rotation of the rear roller 34 whereby to rotate the belts 39 which are slip mounted on the rollers for rotation thereby.

Figure 3:
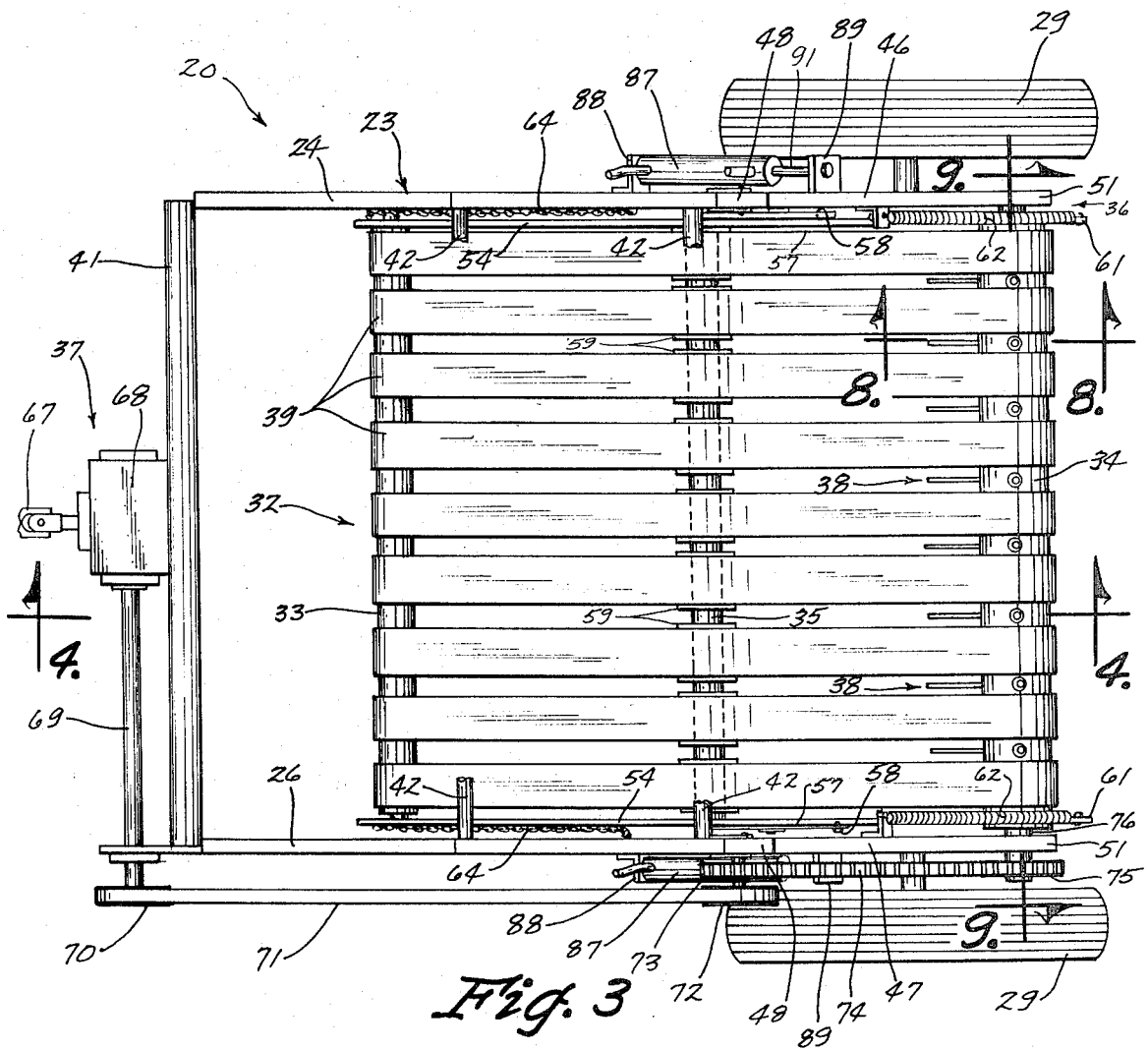
FIG. 3 is a plan view of the hay roll forming apparatus of this invention.

The tooth assembly 38 for the rear roller 34 is best illustrated in FIGS. 3, 8 and 9, and includes a plurality of sets of slots 77, 78 and 79 (FIG. 8) formed in the rear roller 34 and in laterally spaced relation therein as best illustrated in FIG. 9. A rod 81 is fixed in an offset manner within the rear roller 34 as illustrated in FIG. 9, but is adjustable as to its fixed place within the roller 34 by conventional means.

A plurality of teeth units 82 (FIG. 9) are mounted in spaced relation upon the rod 81, with each teeth unit 82 being longitudinally aligned with a set of the slots such that tooth 84 extends toward and is adapted to extend through slot 77, tooth 85 extending toward and adapted to extend through slot 78, and tooth 86 extended toward and adapted to extend through slot 79 as the roller 34 is rotated. Rotation of the roller 34 effects rotation of each teeth unit 82 about the offset rod 81 such that at times a tooth is completely within the roller 34 and at other times the same tooth is extended outwardly therefrom, as is best illustrated in FIG. 8.

From the direction of rotation of the rear roller 34 as illustrated by the arrow in FIG. 8, the teeth become exposed at approximately the 3:00 o'clock position of the rear roller 34, as one views same in FIG. 8, and continue to be exposed outwardly of the rear roller 34 until approximately the 9:00 o'clock position therein, during which time the teeth are engagable with the hay of the swath or windrow 25, and with rotation of the roller 34 effect the beginning of a roll 21a (FIG. 4).

A piston and cylinder unit 87 (FIGS. 1 and 2) is provided on each side of the apparatus 20, being mounted on a bracket 88 and with the piston secured to a connection 89 on each lift arm 46 and 47. Actuation of the units 87 moves the lift arms 46 and 47 from a position resting on the rear edges of the side panels 24 and 26 as best shown in FIG. 4, to a raised position as best illustrated in FIG. 7. Movement of the lift structure 31 carries with it the subframe 32 also as is illustrated in FIG. 7.

In operation of the apparatus 20, during initial operation the lift structure 31 is held in the lowered position of FIG. 4 by the cylinder units 87, with the subframe 32 extended forwardly thereof and close to the ground as is also illustrated in FIG. 4. With movement of the apparatus 20 over the ground due to the travel of the tractor 28, such that the apparatus 20 is pulled directly above and longitudinally of the windrow 25 of hay, rotation of the rear roller 34 effects the beginning of a roll 21a of hay, as is best illustrated in FIG. 4, due to the teeth 84, 85 and 86 (FIG. 8) engaging the hay as a rake and lifting it upwardly.

Continued movement of the apparatus 20 longitudinally of the windrow 25 causes a snowballing enlargening effect of the roll 21b of hay as is best illustrated in FIG. 5. This is accomplished due to the belts 39 engaging and rolling the lifted hay forwardly in a counterclockwise manner as one views FIG. 5. Fy the subframe 32 being free to fall toward the ground, its entire weight bears downwardly upon the roll of hay, helping to compact the roll 21b as is is formed. As the roll of hay becomes larger, as at 21c in FIG. 6, the subframe 32 continues to rock further upwardly about the lower rear end of the lift structure 31, which lower end 52 acts as a fulcrum for the subframe 32, and with the weight of the subframe 32 still helping to compact the roll 21c.

Note from FIG. 6 that with the roll 21c of hay being substantially complete the belts 39 are forced upwardly and into substantially a wide, inverted V-shape against the underside of the intermediate roller 35, due to the size of the roll 21c of hay. It will also be noted that due to the tension placed on the intermediate roller 35, it has swung about the rocker arm 57 down toward its lowest position relative to the other rollers 33 and 34.

When the operator of the apparatus 20, who may still be seated on the tractor 28, considers the roll 21 (FIG. 7) of hay large enough, by a simple manipulation of one of his hydraulic controls (not shown) he actuates the piston and cylinder units 87 such as to extend the pistons 91 (FIG. 7), thereby pivotally raising the lift structure 31 about the pivot ends 48 in the manner best illustrated in FIG. 7. This frees the lift structure 31 and the subframe 32 from the roll 21 of hay such that forward movement of the tractor 28 and the apparatus 20 pulls the apparatus away from its previous containment — so to speak, of the roll 21 of hay (FIG. 7).

In this latter regard, the modification of FIGS. 10–12 is of importance. Referring to those figures, a modified hay roller 20' is disclosed and wherein like reference numerals are used to indicate like structures.

The apparatus 20' is substantially identical to the apparatus 20 of FIGS. 1–9 with the exception that the side panels 92 and 93 (not shown) do not have the leading brace 42 of the FIG. 1 – FIG. 9 embodiment, the chain 64 is eliminated but they do each have a semi-circularly form front curved edge 94. The rear brace 42 of the FIG. 1 – FIG. 9 embodiment is supplanted by an elongated pivot rod 96 which also pivotally connects the upper ends 48 of the lift arms 46 and 47 to the upper ends 49 of the side panels 92 and 93.

Secured at their upper ends to a bar 95 which is connected between the lift arms 46 and 47, and extending downwardly as is illustrated in FIGS. 10 and 11, are a plurality of laterally spaced, flexible fingers 98. The fingers 98 extend downwardly in a curved manner similarly to the curve of the front edges 94, with the lower ends 99 of the fingers 98 free and spaced above the ground 22 a distance sufficient to avoid striking the hay 25.

At each end of the bar 95, a rock arm 101 (FIG. 10) is secured. A jack screw 102 is secured at its upper end to the outer end of the rock arm 101, and extends through an upright member 103 secured to each lift arm 46 and 47. For the purpose of biasing the rock arm 101 and the bar 95 in a counterclockwise direction so as to bias in turn the fingers 98 also in a counterclockwise direction as is viewed in FIG. 10, a compression spring 104 is provided between the rock arm 101 and the upright member 103. At the threaded end 106 of the jack screw 102, an adjusting nut 107 is provided for adjusting the effective length of the jack screw 102, thereby adjusting the position of the rock arm 101 and the fingers 98 relative to the remainder of the apparatus 20.

Additionally, the front roller 33 of the subframe 32 extends forwardly of the side panels 92 and 93, and is provided at each end with a guide member 108 which runs upon a respective edge 94 in the manner of a wheel upon a rail. Each guide member 108 is constructed to prevent lateral movement off the edge 94, such that as the subframe 32 rocks about the rear lower end 52 of the side panels 92 and 93, the guide members 108 move upwardly or downwardly as the case may be, upon the edges 94.

In operation of the modified apparatus 20', it is identical to the operation of the apparatus 20, with the exception that upon movement of the lift structure 31 from the FIGS. 10 and 11 position to the FIG. 12 position, the fingers 98 — extended completely across the apparatus and between the side panels 92 and 93, effect a rearward movement of the roll 21 of hay as is illustrated in FIG. 12, such that an automatic ejection of the roll 21 of hay from the apparatus 20' occurs simultaneously with movement of the lift structure 31 to its raised roll-clearing position.

A second embodiment is depicted in FIGS. 14, 15 and 16, indicated generally at 20''. This embodiment 20'' is substantially identical to the embodiment 20 of FIGS. 1–9, with the exception that the subframe 32, and particularly the extension members 54 (FIG. 3) thereof have been eliminated. Instead, the front roller 33 is rotatably secured between the upper ends 48 of the lift arms 46 and 47 — it being remembered that the upper ends 48 of the lift arms are pivotally connected to the upper rear end 49 of the main frame 23. The rear roller 34 is rotatably secured between the lower ends 51 of the lift arms 46 and 47 as in the FIGS. 1-9 embodiment 20; but the T-member 56 and the rocker arm 57 and spring 58 for mounting the intermediate roller 35 are mounted instead upon the respective lift arms 46 and 47 (FIGS. 14 and 15).

Compared to the FIGS. 1-9 embodiment, the embodiment 20" of FIGS. 14-16 therefore has combined, in effect, the lift structure 31 and the subframe 32 of the former embodiment 20. It will be noted that the belts 39 are still entrained about the three rollers 33, 34 and 35 and function relative to forming a roll 21 (FIG. 15) of hay in a similar manner as the belts 39 of the first embodiment 20.

The plurality of elongated flexible fingers 98 of the second embodiment 20' are also included in the third embodiment 20". It will be noted that the fingers 98 are secured to a bar 95 fixed between the upper ends 48 of the lift arms 46 and 47, such that the fingers 98 extend forwardly and downwardly from the lift arms as is best illustrated in FIGS. 14-16.

Operation of the apparatus 20" is substantially the same as operation of the other two embodiments in that as the apparatus 20" is pulled forwardly of the tractor 28, rotation of the rear roller 34 causes the teeth units 82 associated therewith to begin rolling up the hay. Continued movement of the apparatus 20" causes a further snowballing of the roll 21 of hay (FIG. 15) and wherein the lift structure 31' tends to pivot rearwardly and upwardly about the pivotal connection therewith with the main frame 23, the weight of the lift structure 31 effecting a simultaneous rolling and compaction of the hay being rolled thereunder. The rear roller 34 is rotated by the same driving structure as that illustrated and described with respect to the FIGS. 1-9 embodiment 20, and thus the description of same need not be repeated.

As the roll 21 of hay is formed, the fingers 98 also tend to embrace and compact the roll; and substantially identical to the operation of the fingers 98 in the second embodiment of FIGS. 10-14, upon a complete upward movement of the lift structure 31' (FIG. 16) by the piston and cylinder unit 87, counterclockwise movement of the fingers 98 tends to eject the roll 21 of hay rearwardly from the apparatus 20".

In summation, all three embodiments 20, 20' and 20" disclosed a hay roll forming apparatus comprising basically a portable frame which is towed over the swath of hay 25, and to which is operatively connected a hay raking and lifting assembly operable upon engagement of the hay to rake it forwardly and to lift it upwardly as the apparatus moves forwardly thereby rolling the hay up in snowball fashion. In the FIGS. 1-9 embodiment 20 and in the FIGS. 10-13 embodiment 20', the hay raking and lifting assembly is the subframe 32 and the associated rollers and belts operatively connected to the frame 23 by the lift structure 31; whereas in the FIGS. 14-16 embodiment 20" the hay raking and lifting assembly comprises the combined lift structure 31 and subframe 32 as described hereinbefore.

I claim:

1. A hay roll forming apparatus comprising in combination:

frame means including a pair of interconnected, upright side panels spaced apart a distance sufficient to pass on either side of a hay windrow;

means connected to said frame means for towing connection to a prime mover to move said frame means lengthwise over the windrow;

ground engaging wheel means connected to said frame means;

lift means having an upper end pivotally connected to the upper rear end of said frame means and having a lower end adapted to rest against the lower rear end of said frame means, said lift means pivotally movable about said upper pivot end from a lower position to a raised position upwardly and rearwardly away from said frame means;

a subframe pivotally connected at a rear end thereof to said lift means lower end and extended substantially forwardly thereof toward said towing connection means and closely adjacent and parallel to said side panels, said subframe including at least a trio of elongated rollers rotatably mounted and extended laterally transversely between said side panels, said rollers forming a triangular formation in side elevation with the rearmost roller mounted closely adjacent said subframe rear end and with an intermediate roller movably mounted relative to said other rollers;

means connected between said subframe and said frame means for normally biasing said subframe about its pivoted rear end toward a spaced position above the ground;

means connected to said frame means and operatively connected to said rearmost roller for rotating said rearmost roller;

teeth means associated with said rearmost roller and rotatable therewith in the direction of movement of the hay roller and engagable with hay in the windrow whereby to start a roll of hay in front of said rearmost roller as the hay roller moves forwardly; and a plurality of flexible belts trained about said trio of rollers in laterally spaced relation across said rollers and between said side frames and engageable with the roll of hay as it is formed and enlarged.

2. A hay roll forming apparatus as defined in claim 1, and further wherein said side panels are carried closely adjacent the ground to contain the hay as it is rolled.

3. A hay roll forming apparatus as defined in claim 1, and further wherein said lift means comprise a pair of elongated members which depend from their upper pivotal connection parallel to each other and longitudinally aligned with said side panels.

4. A hay roll forming apparatus as defined in claim 1, and further wherein said trio of rollers includes a forward roller disposed toward the front of the apparatus, the intermediate roller disposed at the apex of the triangular formation, and with the rollers extended parallel to each other.

5. A hay roll forming apparatus as defined in claim 1, and further wherein said subframe biasing means includes a chain fastened between said frame means and the front end of said subframe for limiting the downward movement of said front end toward the ground.

6. A hay roll forming apparatus as defined in claim 1, and further wherein said rearmost roller has a plurality of laterally spaced sets of slots formed therein, each set of slots having a plurality of arcuately spaced slots formed therein; and with said teeth means comprising an elongated rod disposed within said rearmost roller and extended offset and parallel to the longitudinal axis of said rearmost roller, and a plurality of teeth units rotatably secured in laterally spaced relation on said rod, each teeth unit aligned with a set of slots and each teeth unit including a plurality of radially extended teeth each tooth of which is extended toward and adapted to extend through a respective slot, said teeth units rotatable upon said rod in response to rotation of said rearmost roller.

7. A hay roll forming apparatus as defined in claim 6, and further wherein each of said belts is disposed between a set of slots such that exposed teeth in each adjacent set of slots form a wall limiting thereby lateral movement of said each belt.

8. A hay roll forming apparatus as defined in claim 1, and further wherein rake means is secured to said lift means, and including means biasing said rake means rearwardly of the apparatus for tending to push rearwardly from the apparatus the roll of hay formed thereby.

9. A hay roll forming apparatus as defined in claim 8, and further wherein said rake means comprises a plurality of laterally spaced, flexible steel fingers secured at their upper ends to a member disposed laterally across said lift means, said fingers disposed downardly toward the ground adjacent the front end of said subframe, and with a spring unit biasing said fingers toward the rear of the apparatus.

10. A hay roll forming apparatus as defined in claim 4, and further wherein said side panels each has a leading edge which is curved upwardly and rearwardly of the apparatus in a semi-circularly formed manner, and with said forward roller having a pair of guide members mounted at each end thereof, each guide member adapted to ride along a respective leading edge of a side panel upon movement of said subframe about said lift means.

11. An apparatus for forming a roll of hay from a swath of cut hay lying on the ground, comprising:
portable frame means adapted to be moved longitudinally over the hay swath; and
hay raking and lifting means including a subframe having an upper end pivotally connected at the top of said frame means and movable from a lower operative position resting on said frame means to a raised inoperative position spaced above said frame means, said hay raking and lifting means including a rotatable tooth assembly having an axis of rotation and operable in said operative position to rake the hay forwardly as the frame means moves forwardly and to lift it upwardly, and including further a belt assembly operable in conjunction with said tooth assembly and moveable about said axis of rotation for rolling up the raked hay in snowball fashion.

12. An apparatus as defined in claim 11 and further wherein said hay raking and lifting means includes a subframe unit pivotally connected at its rear end relative to said frame means and adapted to pivot of its own weight downwardly about said rear end toward the ground.

13. An apparatus as defined in claim 12 and further wherein lift means is connected to said frame means which is operable to effect a lifting of said hay raking and lifting means upwardly from said frame means whereby to clear the hay roll from the apparatus.

* * * * *